United States Patent
O'Brien et al.

(10) Patent No.: US 10,868,777 B1
(45) Date of Patent: *Dec. 15, 2020

(54) POWER MANAGEMENT OF ROUTING TABLES USING VERTICAL SCALING

(71) Applicant: Amazon Technologies, Inc., Seattle, WA (US)

(72) Inventors: Kari Ann O'Brien, Austin, TX (US); Bijendra Singh, Cedar Park, TX (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/008,646

(22) Filed: Jun. 14, 2018

Related U.S. Application Data

(63) Continuation of application No. 15/148,965, filed on May 6, 2016, now Pat. No. 10,003,555.

(51) Int. Cl.
*H04L 12/931* (2013.01)
*H04L 12/743* (2013.01)
*H04L 12/755* (2013.01)

(52) U.S. Cl.
CPC .......... *H04L 49/405* (2013.01); *H04L 45/021* (2013.01); *H04L 45/7453* (2013.01)

(58) Field of Classification Search
CPC ........... H04L 45/54; H04L 45/745–748; H04L 49/9084; G06F 17/30312; G06F 17/3033; G06F 16/2255; Y02D 10/13
See application file for complete search history.

(56) References Cited

U.S. PATENT DOCUMENTS

| | | |
|---|---|---|
| 8,938,469 B1 | 1/2015 | Keen et al. |
| 9,898,069 B1 | 2/2018 | O'Brien |
| 2003/0026259 A1 | 2/2003 | Brown |
| 2004/0100950 A1 | 5/2004 | Basu et al. |
| 2012/0307640 A1 | 12/2012 | Wackerly et al. |
| 2014/0361828 A1 | 12/2014 | Lundberg |

OTHER PUBLICATIONS

U.S. Appl. No. 14/981,664, titled, "Pipelined Evaluations for Algorithmic Forwarding Route Lookup," filed Dec. 28, 2015.
U.S. Appl. No. 15/087,291, titled "Power Reduction Methods for Variable Sized Tables," filed Mar. 31, 2016.
U.S. Appl. No. 15/148,947, titled "Power Management of Routing Tables Using Horizontal Scaling," filed May 6, 2016.
U.S. Appl. No. 15/932,244, titled "Power Reduction Methods for Variable Sized Tables," filed Feb. 16, 2018.
U.S. Appl. No. 15/148,965, "Corrected Notice of Allowability", dated May 17, 2018, 3 Pages.
U.S. Appl. No. 15/148,965, "Non-Final Office Action", dated Sep. 29, 2017, 11 pages.
U.S. Appl. No. 15/148,965, "Notice of Allowance", dated Mar. 2, 2018, 5 pages.

*Primary Examiner* — Pao Sinkantarakorn
(74) *Attorney, Agent, or Firm* — Kilpatrick Townsend & Stockton LLP

(57) ABSTRACT

Power management of a routing table, which comprises a plurality of hash tables, is provided by supporting various power domain configurations. Each power domain configuration can be associated with a different number of power domains than other power domain configurations. Each power domain can add vertical capacity to the entire routing table by adding a fixed number of buckets to each of the hash tables. Efficient power management can be achieved by switching between a lower power domain configuration and a higher power domain configuration during runtime based on the dynamic load conditions.

23 Claims, 11 Drawing Sheets

US 10,868,777 B1

POWER MANAGEMENT OF ROUTING TABLES USING VERTICAL SCALING

CROSS REFERENCE TO RELATED APPLICATIONS

This application is a continuation of U.S. Non-Provisional patent application Ser. No. 15/148,965, filed May 6, 2016, issued to U.S. Pat. No. 10,003,555 on Jun. 19, 2018, and entitled "POWER MANAGEMENT OF ROUTING TABLES USING VERTICAL SCALING," the content of which is herein incorporated by reference in its entirety.

BACKGROUND

Data tables can be used in various electronic and computer devices to store data in an organized manner so that specific data elements can later be retrieved. For example, network switches can contain large data tables that can include routing tables that can store and/or update the identifiers associated with forwarding of network data to other interconnected network devices. These identifiers can indicate network routes (or the next stop along such a route) to the other network devices. The size of these routing tables can become increasingly large when associated with large numbers of network devices.

Routing tables are traditionally implemented using Ternary Content-Addressable Memories (TCAMs) for faster route lookup time. However, TCAMs consume more power as compared to static random access memories (SRAMs). In some instances, blocks of TCAMs can be switched on or off at power-up of a network device to save power based on a deployment configuration. However, once the network device is deployed in the field, power configuration of the network device cannot be changed based on changing load conditions. In most instances, changing the power configuration may require rebooting of the network device. This can result in loss of packets or rerouting of the packets causing huge overhead at the system level.

BRIEF DESCRIPTION OF THE DRAWINGS

Various embodiments in accordance with the present disclosure will be described with reference to the drawings, in which.

DETAILED DESCRIPTION

Figure 1:
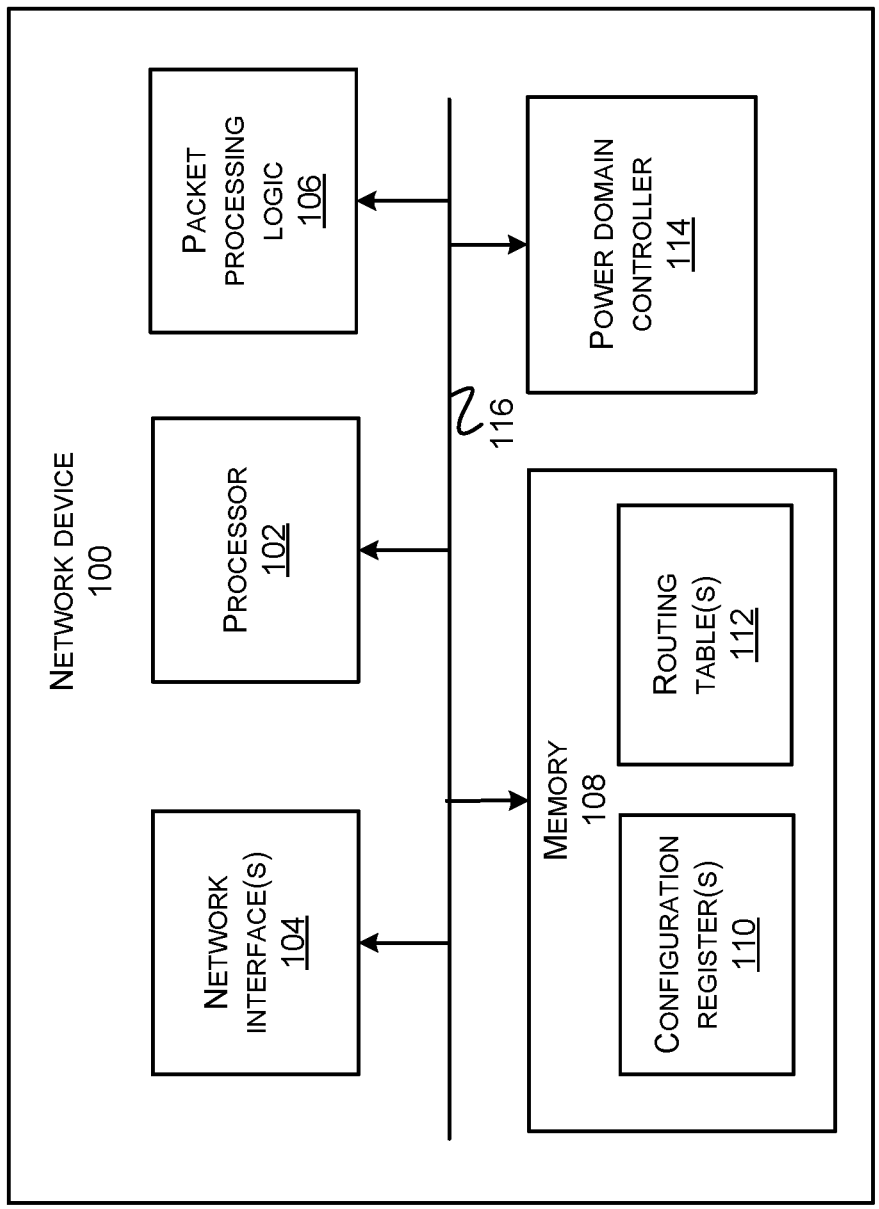
FIG. 1 illustrates a network device according to an embodiment of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Data tables are structures that can be used in many different computer devices for various purposes. Data tables can comprise many different elements and can be used to locate a specific element of the data table. Various algorithms, such as hash or key generation algorithms can be used to store and/or retrieve data associated with specific elements of a data table according to a specific input data set. As one example, a routing table for a network device can comprise a type of data table. The routing table may also be called a forwarding table. The network device can be a switch, a router, a hub, a node or any suitable network capable device. The network device can receive network packets and route them to appropriate external network devices on a network. One method for determining the next destination for such a transfer is through the use of a routing table. A routing table can comprise indicators of multiple network addresses, each corresponding to an external network device. A network device can receive a network packet as an input data set which can be parsed and associated with an element of a routing table. By locating the associated entry, the network device can obtain a routing indicator and then forward the network packet to the appropriate external networking device. For example, a final destination address can be parsed from the network packet. A routing table can be used to retrieve a destination of an external network device that the network packet can be transferred to intermediately on route to the final destination.

In most instances, a routing table for a network device is implemented using ternary content-addressable memories (TCAMs). A TCAM is a specialized type of high-speed memory that can search its entire contents, for example, in a single clock cycle by performing parallel searches. Generally, an ingress packet includes a network address, which can vary in size depending on a subnet configuration, and a host address, which can occupy the remaining bits. Each subnet has a network mask that specifies which bits of the address include the network address and which bits include the host address. Routing can be done by consulting the routing table which contains each known destination network address, the associated network mask, and the information needed to route packets to that destination. In a TCAM, the addresses can be stored using "don't care" for the host part of the address, so looking up the destination address in the TCAM can immediately retrieve the correct routing entry. This can only work if the entries are stored in order of decreasing network mask length. The hardware returns only the first matching entry; thus, the match with the longest network mask (longest prefix match) can be used. Thus, due to the ordering dependency in TCAMs, entries that appear in a lower index have higher priority of a match than the entries that appear in a higher index.

It should be understood that depending upon the complexity and size of a network infrastructure, the size and complexity of a routing table for a network device of the network infrastructure can become large and unwieldy. Additionally, the network device is generally designed to operate in relatively large and relatively small network infrastructures. Consequently, the amount of memory can be selected to accommodate routing table(s) large enough to accommodate relatively large network infrastructures having many different networking devices. When such a network device is utilized in a relatively small network infrastructure, the entire memory space allocated for routing table(s) may not be fully utilized because the current routing table may be relatively small. The unused portions of memory dedicated to the routing table entries that are not used may still consume electrical power for maintenance or other operations. For these smaller network infrastructure implementations, this additional electrical power draw can result in excessive operating expenses to provide power for the unused memory, generate excessive heat for the device and the power providing circuitry, and lead to reduced maintenance schedules for the network device and supporting infrastructure to accommodate the additional power and heat.

In some instances, blocks of TCAMs can be turned on or off at reset or power-up to save power for certain deployment configurations, e.g., for relatively small network infrastructures which do not require large routing tables. However, once the network device is deployed in the field, power configuration cannot be changed dynamically to adjust power requirements due to change in load conditions. In most instances, the network device may need to be rebooted to configure it for a different power setting. This can result in a drop in packets or reroute of the packets passing through the network device at reboot. Hence, use of TCAMs in the routing table may result in increased system overhead and may not provide a flexible solution for power management in network devices.

Various embodiments of the disclosed technologies can utilize Static Random Access Memories (SRAMs) to implement routing tables using algorithmic TCAM techniques to provide a flexible solution for power reduction in network devices. A power management algorithm, in accordance with various embodiments, can continuously evaluate current load conditions in a network device in terms of a number of total network routes currently programmed and can dynamically redistribute them in the routing table to achieve minimum power consumption configuration and enable (e.g., turn-on) or disable (e.g., turn-off) parts of the routing tables to save power. In some embodiments, a routing table may include a plurality of hash tables and each hash table can include multiple sets of buckets. Each bucket from each set of buckets may include a predefined number of entries to store routing data. For example, in one implementation, a routing table may include eight hash tables and each hash table may include eight sets of buckets. Each set of buckets may include 128 buckets and each bucket may include 14 entries. Hash, being random in nature, can allow insertion of a route entry anywhere in the SRAMs used for implementing the routing table, in contrast to TCAMs which can be restricted to ordering dependency.

According to the embodiments, each set of buckets may be associated with a power domain from a plurality of power domains. A route capacity associated with a power domain may indicate a number of physical entries supported by the power domain. A power domain may include areas in a circuit that can generally be grouped by common power environments and power strategy, e.g., for power on and off conditions, operating voltage, power supply nets, etc. For example, a first set of buckets from each hash table may be associated with a first power domain, a second set of buckets from each hash table may be associated with a second power domain and a third set of buckets from each hash table may be associated with a third power domain, and so on. The first power domain, second power domain, and the third power domain may be enabled or disabled independently and without affecting other power domains. An enabled power domain may indicate that the power domain is turned on (e.g., power is supplied to the circuit associated with the power domain) and a disabled power domain may indicate that the power domain is turned off (e.g., no power is supplied to the circuit associated with the power domain).

In some embodiments, a routing table can support a plurality of power domain configurations to implement power domain scaling. For example, each power domain configuration may include one or more power domains. The number of power domains for each power domain configuration may be different from other power domain configurations. Each successive power domain configuration from the plurality of successive power domain configurations can include one or more additional power domains than a prior power domain configuration. For example, a first power domain configuration may include one power domain, a second power domain configuration may include two power domains, a third power domain configuration may include four power domains, and so on. Each successive power domain configuration can support a certain number of network routes which can be greater than the prior power domain configuration. The number of network routes supported by each power domain configuration can be predetermined or dynamically computed. For example, each power domain configuration can support a certain route capacity in terms of the number of network routes. The route capacity may indicate a total number of physical entries that can be supported by a power domain configuration. For example, in some embodiments, a total number of physical entries supported by a power domain configuration may be calculated based on a number of buckets associated with each power domain in the power domain configuration and the number of entries in each bucket.

According to some embodiments, each power domain may add vertical capacity to the entire routing table by adding a fixed number of buckets to each hash table. For example, the first power domain may add 128 buckets to each hash table, the second power domain may add another 128 buckets to each hash table and the third power domain may add another 128 buckets to each hash table. Embodiments of the disclosed technologies can allow enabling or disabling a power domain during run-time to implement power management. For example, a current power domain configuration can be switched to a next higher or a next lower power domain configuration based on the dynamic load requirement. A next higher power domain configuration may include a power domain configuration which has higher number of power domains, and hence more route capacity than the current power domain configuration. A next lower power domain configuration may include a power domain configuration which has fewer power domains, and hence lower route capacity than the current power domain configuration. Thus, according to the embodiments, vertical scaling can allow addition or removal of a fixed number of buckets across the routing table. Some embodiments of the technology can allow migration of entries from a domain associated with the higher power domain configuration to the domain(s) associated with the lower power domain configuration. Therefore, embodiments of the disclosed technology can allow dynamic scaling of the power domains based on the real time load conditions without rebooting the network device, thus minimizing system overhead for power management of the routing tables.

FIG. 1 illustrates a network device 100 according to an embodiment of the disclosed technologies. The network device 100 may be configured to interface with a plurality of different networking devices (not shown). For example, the network device 100 can interface with personal computers, network switches, network hubs, mobile devices, or other networking devices. The network device 100 may be implemented as an application specific integrated circuit (ASIC), a field programmable gate array (FPGA), a system-on-chip (SoC), a system-in-package (SiP) or as any suitable circuit.

The network device 100 may include a processor 102, network interface(s) 104, a packet processing logic 106, a memory 108 and a power domain controller 114. Note that the network device 100 may include more or fewer components than illustrated in FIG. 1. An interconnect 116 can be used to pass information between the various components of the network device 100. For example, the interconnect 116 can include point to point interconnect(s), common bus(es), interconnect fabric, or a combinations thereof.

The processor 102 may include one or more processing cores, e.g., an x86 or ARM® compatible processor cores. The processor 102 may be configured to execute instructions stored in a computer readable medium. For example, the instructions may include instructions to implement some of the functionality associated with the power domain controller 114 or the routing tables 112. In some embodiments, the computer readable medium may be part of the memory 108.

The network interface(s) 104 may include one or more interfaces to communicate with other devices on a network. In one implementation, the network interface(s) 104 may include one or more network ports (e.g., Ethernet ports) to communicate with other networking devices (not shown) on the network using a network protocol, e.g., Transmission Control Protocol/Internet Protocol (TCP/IP), Domain Name System (DNS), Hypertext Transfer Protocol (HTTP), Dynamic Host Configuration Protocol (DHCP), etc. The network interface(s) 104 can also implement various speeds and methods of transmission such as 100 Gigabit (G), 10G, 1G, wired or wireless transmissions. The network device 100 may receive or transmit a packet via the network interface 104. The packet may be a network packet, e.g., a Layer 3 (L3) packet, a label switching (LS) packet, a Layer 2 (L2) packet, etc. For example, the packet may be an Internet Protocol (IP) packet comprising an IP header and a payload.

The packet processing logic 106 may include logic to process the packets received via the network interface 104. For example, the packet processing logic 106 may include logic to parse the packet to extract a packet header and a payload. The packet header may include a source address, a destination address, a version number, a packet length, a time-to-live, and any other relevant information. In some implementations, the packet header may include information for forwarding the packet to the next destination on the network. For example, information from the packet header may be used to look up an entry in the routing tables 112 to make forwarding decisions.

The memory 108 may include configuration register(s) 110 and routing table(s) 112. The memory 108 can be implemented using a static Random Access Memory (RAM), dynamic RAM, double date rate (DDR) RAM, flip-flops, or other types of memory suitable for storing data. The memory 108 can include memory partitioned or otherwise selected for use by the routing table(s) 112.

The configuration registers 110 may include one or more registers that may be used to store various configuration identifiers for various power domain configurations, route capacity (Rc) supported by various power domain configurations, and any other information. For example, the configuration identifiers may be used to identify different power domain configurations, e.g., a first power domain configuration, a second power domain configuration, a third power domain configuration, etc., that can be supported by the network device 100. In some embodiments, configuration registers 110 may be configured to store a plurality of successive power domain configurations. Each successive power domain configuration from the plurality of successive power domain configurations can include an additional power domain than a prior power domain configuration. For example, the first power domain configuration can include one power domain, the second power domain configuration can include two power domains, and the third power domain configuration can include three power domains, etc. In addition, each successive power domain configuration can support a higher number of network routes (e.g., route capacity) than the prior power domain configuration. For example, each power domain configuration can support higher number of buckets, and hence the entries, from each hash table than the prior power domain configuration. As an example, the first power domain configuration can support 2K routes, the second power configuration can support 4K routes and the third power configuration can support 8K routes, etc. The number of network routes supported by each power domain configuration can be predetermined or can be computed dynamically. For example, in one embodiment, the number of network routes supported by different power domain configurations can be predetermined based on simulation results or from field data and can be programmed at the power up time. In another embodiment, the number of network routes supported by different power domain configurations can be computed dynamically during runtime, e.g., based on types of current network routes, requests for insertion of new network routes in the routing tables, etc. In some implementations, the number of network routes computed dynamically for different power domain configurations can be stored in the memory 108 that can be accessed by the power domain controller 114 to perform vertical scaling of the power domains.

The routing table(s) 112 may be used to store data associated with routing of the network packets, e.g., network device addresses, distances between network device 100 and particular network destinations, or any other information used in forwarding or routing of the network packets. The routing tables 112 may include one or more routing tables as discussed with reference to FIG. 2.

Figure 2:
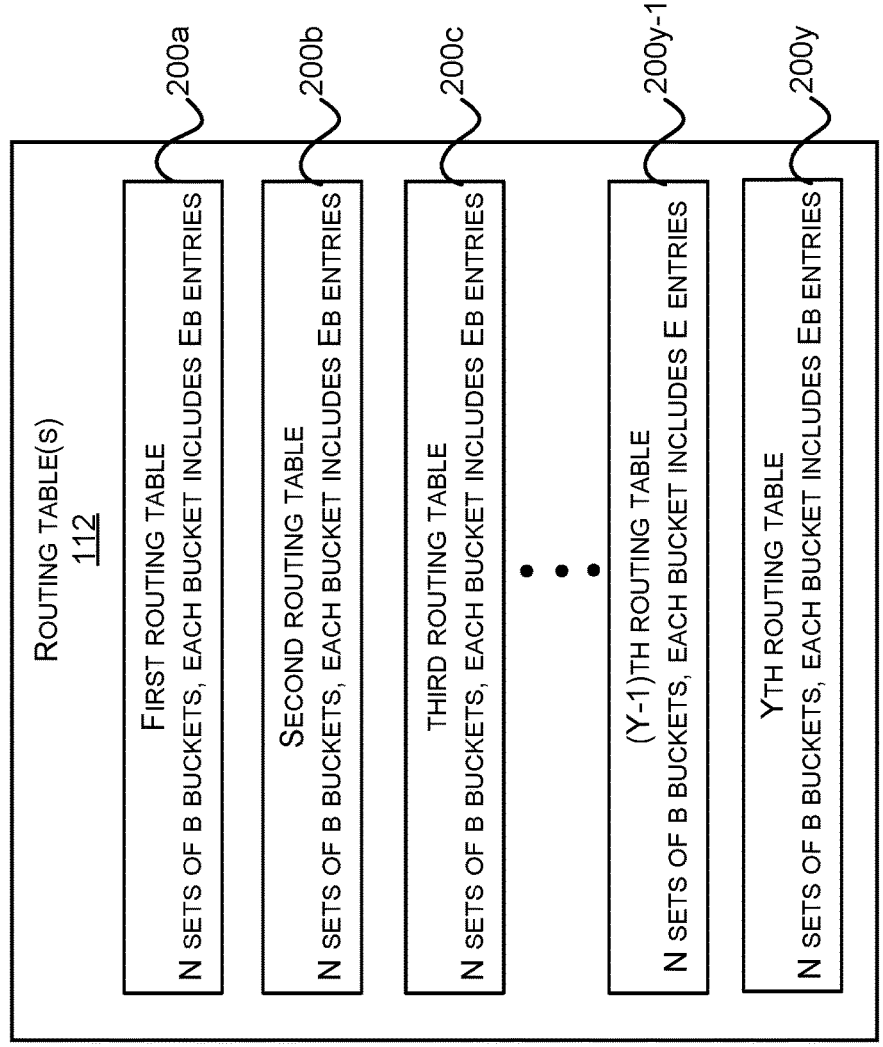
FIG. 2 illustrates a logical view of the routing tables, according to one embodiment of the disclosed technologies.

FIG. 2 illustrates a logical view of the routing tables 112, according to one embodiment of the disclosed technologies.

In one embodiment, the routing tables 112 may include a plurality of routing tables, e.g., a first routing table 220a, a second routing table 200b, a third routing table 200c, a $(Y-1)^{th}$ routing table 200y-1 and a $Y^{th}$ routing table 200y.

Each of the routing table 200a, 200b, 200y, may include the same number of buckets. For example, each of the routing table 200a-200y may include N sets of B buckets. Each of the routing table 200a, 200b, . . . , 200y, may include buckets at successive indices. For example, each routing table may include buckets at index 1, 2, . . . , ((N×B)−1), and (N×B). Each of the B buckets may include Eb number of entries (e.g., entries/bucket). For example, each entry can be used to store data associated with a network route. Thus, each routing table from the plurality of routing tables 200a-200y may include (N×B×Eb) number of entries, and the routing table 112 may include (Y×N×B×Eb) number of entries, where "x" is a multiplication factor. Each of the N, B, Eb and Y may include positive integers. For example, in one implementation, N can be 8, B can be 128, Eb can be 14 and Y can be 8. According to some embodiments, each of the routing tables 200a-200y may be implemented using a hash table. A hash table is a data structure that implements an associative array which can map keys to values. For example, the hash table can be an array of elements, and each element can be called a bucket. A hash table uses a hash function to compute an index into an array of buckets or slots, from which the desired value can be found. A hash function that provides a uniform distribution of hash values can minimize hash collisions. Hashing allows distribution of the entries (key/value pairs) across an array of buckets. Given a key, the entry can be found using the index. The hash table implementation can allow insertion of a route entry in any of the hash tables without any ordering dependency as encountered by the TCAM implementation. In one implementation, each of the routing tables 200a-200y can be searched in parallel which can result in Y number of matches with equal priority. In some embodiments, each of the routing tables 200a-200y may be implemented using SRAMs. For example, each set of B buckets for each hash table can be implemented using a set of SRAMs that can be associated with an independent power domain and can be enabled or disabled based on different power domain configurations. Routing tables 112 will be further explained with reference to FIG. 5.

Referring back to FIG. 1, the routing table(s) 112 may be used by the network device 100 to optimize prioritization of the transfer of network packets along with, for example, Quality of Service (QOS) or other optimizations. Although, the routing table(s) 112 are used here as an example, it should be understood that various other functions (even outside of a network device) can be associated with and/or use the functionality of a data table or similar memory construct. As one such example, a device cache can use a data table to increment cache hits and/or misses. As such, this disclosure is not limited to a data table for use with only a network device such as the network device 100, but can be used in a wide variety of devices for a wide variety of purposes. Many data tables and other memory constructs can benefit from the disclosure herein. Depending upon the number of network devices within a particular implementation of a network device within a network infrastructure, the number of entries of the routing table(s) 112 can very. If all of the entries of the routing table(s) 112 are not utilized, then all of the memory allocated for the routing table(s) 112 may not be used, but may still be powered. Generally, memory that is not utilized may consume power and may needlessly lead to increased power draw by a network device. Various embodiments of the disclosed technologies can continuously evaluate the current load conditions in the network device 100 in terms of number of total routes currently programmed and dynamically redistribute the entries in the routing table 112 to achieve minimum power consumption configuration and enable or disable parts of the routing tables 112 to save power using the power domain controller 114.

The power domain controller 114 may be configured to provide power management of the routing tables 112. In some embodiments, the power domain controller 114 may be configured to continuously evaluate the current load conditions in the network device 100 in terms of the total number of routes currently processed by the network device 100 and may dynamically redistribute the entries among the power domains to achieve minimum power consumption configuration and disable and enable parts of the routing tables 112 to save power. In some implementations, the network device may start with a current power domain configuration at power-up. For example, the current power domain configuration may be determined by identifying a power domain configuration from a plurality of power domain configurations that can support a route capacity greater than a total number of network routes. For example, in some implementations, the total number of network routes may have been predetermined at the start-up time based on simulation results. In some implementations, the power domain controller 114 may determine the total number of network routes by accessing the configuration registers 110. The power domain controller 114 may determine if the route capacity of the next lower power domain configuration is more or less than a threshold for the current power domain configuration. In some implementations, a threshold may include a predefined number of routes supported by the current power domain configuration. For example, in some instances, the current power domain configuration may include at least one more power domain than the next lower power domain configuration. If the route capacity of the next lower power domain configuration is more than the total number of current routes, the current power domain configuration can be switched to the next lower power domain configuration. For example, in some embodiments, the entries from the buckets which extend into the power domain associated with the current power domain configuration, which is not part of the next lower power domain configuration, can be identified and migrated to the buckets in the power domain(s) associated with the next lower power domain configuration. For example, migration can include copying data stored in the identified entries from a first bucket to a second bucket. Thus, after the entries are copied from the given power domain, the entries can be deleted from the first bucket. The power domain controller 114 can disable the given power domain from the current power domain configuration to save power.

In some instances, the power domain controller 114 can evaluate if an additional power domain has to be enabled when a request to insert a new route in the routing tables 112 is received. For example, if the total number of current routes is more than the route capacity of the current power domain configuration, the current power domain configuration may be switched to the next higher power domain configuration, which includes additional power domain(s), to add more capacity to the routing tables 112. The next higher domain configuration may include an addition of a fixed number of buckets across the routing tables 112. The new route can be inserted into any of the buckets from the power domains associated with the next higher power domain configuration. For example, the power domains associated with the next higher power domain configuration may include already enabled power domains and the additional power domain(s).

Figure 3:
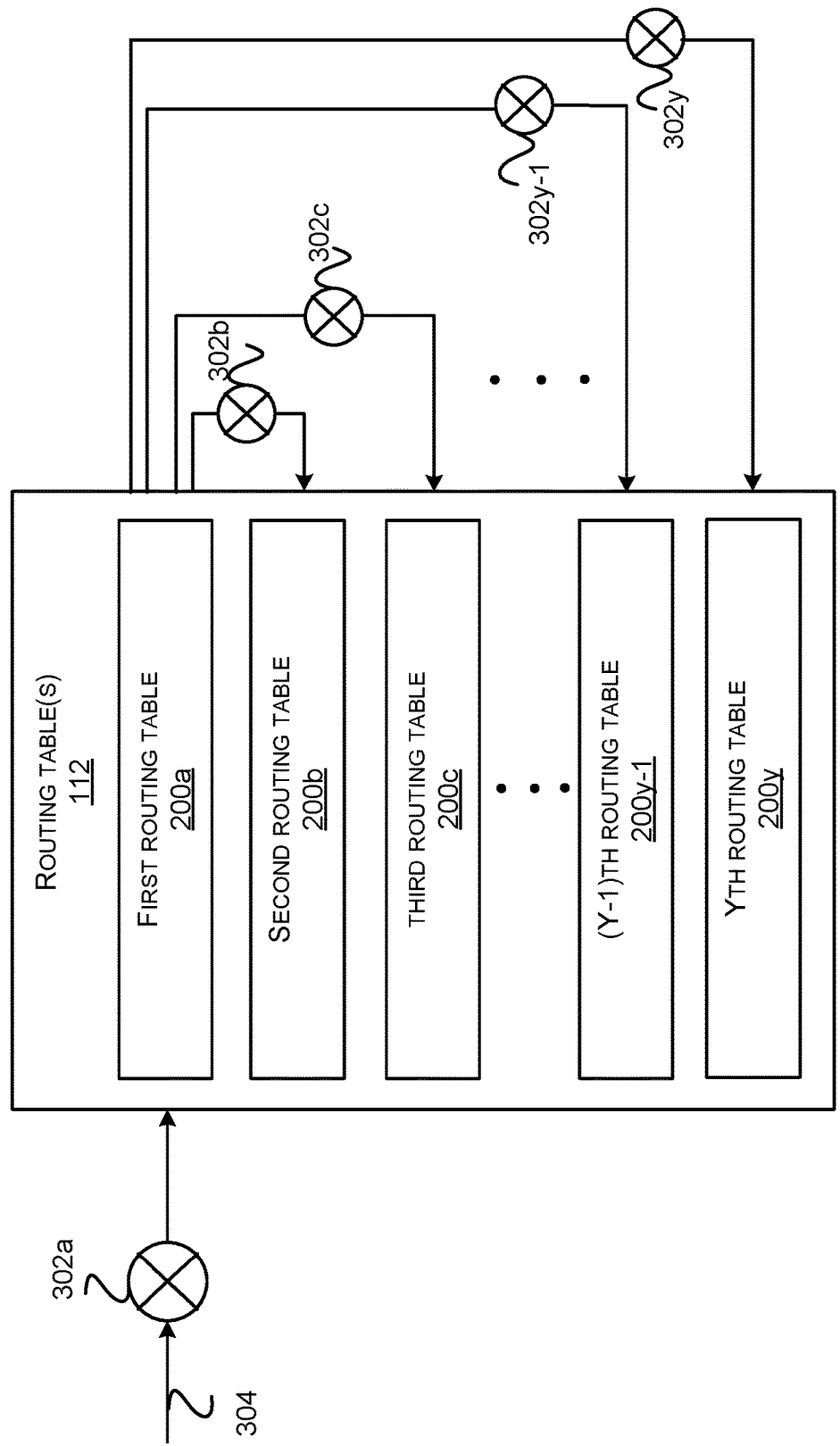
FIG. 3 illustrates a method for a route insertion using hash functions.

FIG. 3 illustrates a method 300 to insert a route in the routing table. Embodiments of the disclosed technologies have been discussed using the method 300 for route insertion; however, it will be understood that any suitable route insertion method can be used.

In one embodiment, a hash function 302a may be used to insert a network route of a packet in the routing table 112. For example, the hash function 302a can be used to hash certain fields of a packet 304 to generate an index and a key to insert the network route in any of the buckets from any of the routing tables 200a-200y. In some implementations, the network route can be treated as a binary polynomial. For example, a divisor polynomial can be used which can divide the route using a modulo-2 arithmetic to generate a quotient and a remainder. The remainder can be used as an index into the hash table and the quotient, called the key, can be stored as a key matching value inside the entry. In some embodiments, the hash function 302a may use a virtual routing and forwarding identifier (VRF-ID), and a prefix for a route from the packet 304. For example, in a given route "17.20.30.55/32", the route is "17.20.30.55" and the prefix is 32. In some implementations, the VRF-ID, route and the prefix may be provided by the packet processing logic 106 after parsing the packet header. The VRF-ID may indicate an identifier for a route in a virtual routing and forwarding domain. The prefix may indicate a number of bits that may be used to segment the route. For example, a network route (e.g., an IPv4 route) may include a destination address including any number of bits from 1 to 32. In some implementations, the prefix may include a closest desired length prefix (DLP), which can be a multiple of 4, e.g., 4, 8, 12, 16, 20, 24, 28, 32, if the routing table 112 includes 8 hash tables (e.g., Y=8). The route can be rounded down to the nearest DLP and the remaining bits, referred to as next-hop-address (NHA) map, can also be stored with the key. In some implementations, for 8 prefixes, 8 transformed routes can be generated using the 8 prefixes and can be prepended using the VRF-ID (e.g., 4 bits) to get a better coverage of the hash function. Thus, the hash calculation can be performed using the polynomial division based on a predetermined polynomial on each of the 8 transformed routes which can produce 8 pairs of quotients and remainders. For example, each hash function may provide a hash table identifier (ID) and a bucket index. The key and the NHA map can be inserted at the bucket index for the given hash table ID.

Using the above described method; each route can be inserted at many possible alternate locations given by different hash functions. For example, for a given route, a hash function 302a, a hash function 302b, a hash function 302c, a hash function 302y-1 and a hash function 302y may be computed. The same hash functions can be used when performing a search for a route to compute a match, e.g., longest prefix match (LPM). Hence, the route insertion method can allow multiple alternative locations for a route to be stored or to be migrated if need arises. Computation of the bucket index inside each of the routing tables 112 can be done using a maximum possible number for the bucket capacity based on a maximum physical bucket count possible. If the bucket count per hash table (based on the current power domain configuration) is lower than the maximum capacity (always by an integer factor) then a new bucket index can be determined by rounding the bucket index value by the factor equal to the current hash table bucket capacity compared to the maximum possible bucket capacity. This factor can be stored in each entry. For example, the maximum bucket capacity for each hash table can be 1K (1024) but the current power domain configuration can only enable 128 entries per hash table then the hash table bucket index can be calculated using 1024 as the total capacity, but the value can be rounded down using a modulo 128 operation and the rounding down factor can be stored in the entry. For example, if the bucket index was 500 then index=(500% 128)=116, rounding factor=500/128=3.

In one embodiment, if the bucket at an index given by a first hash function is full, route migration can be performed. For example, the route migration may be implemented by computing another hash table ID and the bucket index to insert the route with enough information to determine a match at this alternate location. As illustrated in the figure, if the bucket from the first routing table 200a at an index computed by the hash function 302a is full, another index for a bucket from the second routing table 200b can be computed using the hash function 302b. Similarly, if the bucket from the second routing table 200b at an index computed by the hash function 302b is full, another index for a bucket from the third routing table 200c can be computed using the hash function 302c. If the bucket from the third routing table 200c at an index computed by the hash function 302c is full, another index for a bucket from the (Y−1)th routing table 200y-1 can be computed using the hash function 302y-1. If the bucket from the (Y−1)th routing table 200y-1 at an index computed by the hash function 302y-1 is full, another index for a bucket from the Yth routing table 200y can be computed using the hash function 302y. If the bucket at an index given by the hash function 302y is full, the route cannot be inserted and an error may be returned. Thus, hashing can allow randomization so different entries in each bucket can have different routes with different prefixes. The route can be stored at an original prefix or a migrated prefix and can be found accordingly during a search process.

Figure 4:
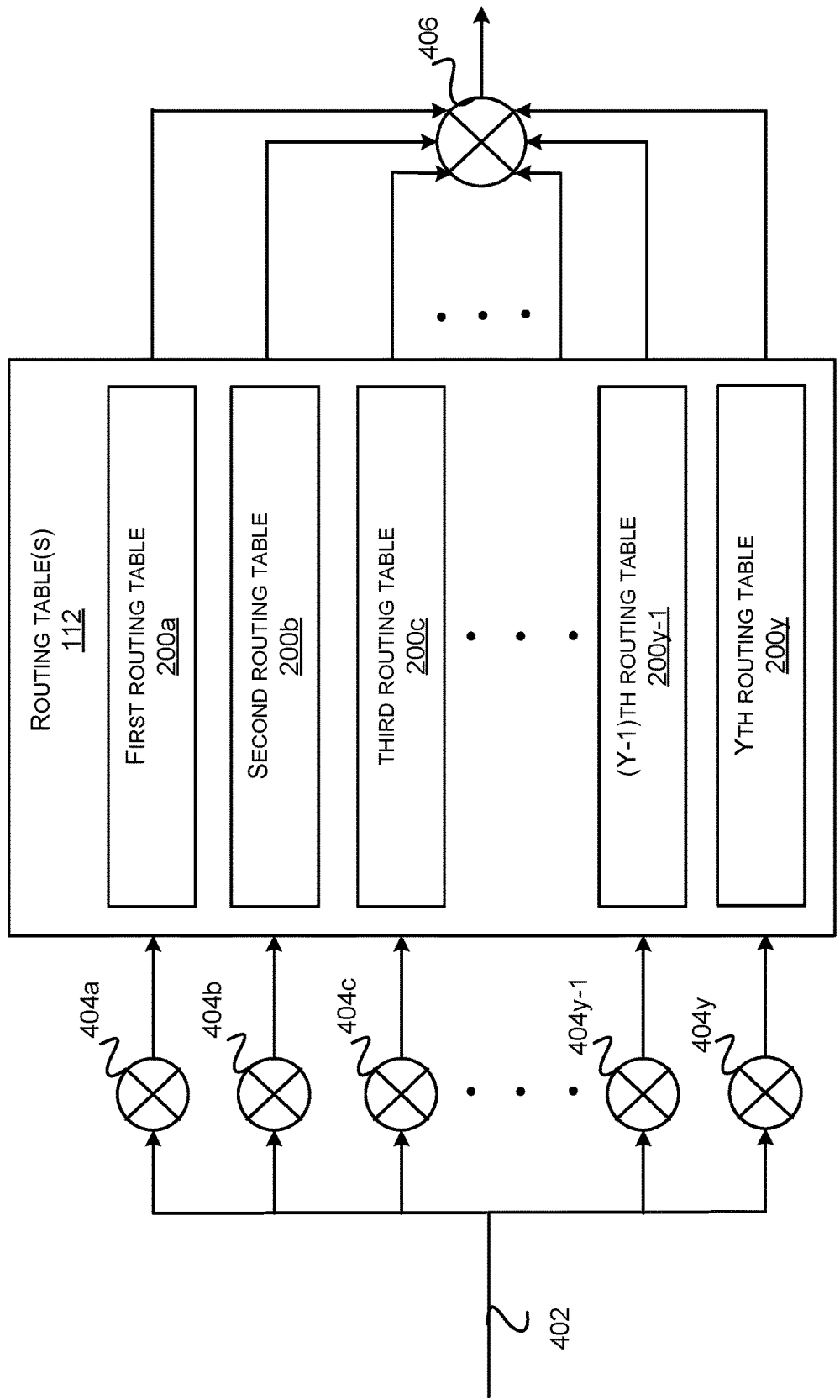
FIG. 4 illustrates a method for a route search process using a longest prefix match.

FIG. 4 illustrates a method 400 for a route search process using a longest prefix match.

When a packet is received, a hash can be computed using a hash function to identify all the potential buckets that route might be in. The key can be used to match against all the potential buckets to find the right route. For example, a hash function 404a can provide an index for the first routing table 200a, a hash function 404b can provide an index for the second routing table 200b, a hash function 404c can provide an index for the third routing table 200c, a hash function 404y-1 can provide an index for the (Y−1)th routing table 200y-1, and a hash function 404y can provide an index for the Yth routing table 200y. When searching for a LPM match for an ingress packet 402 using its {destination IP address, VRF-ID}, all hash functions can be used to compute hash table indexes using prefix lengths of {4, 8, 12, . . . , 32} and all the routing tables 200a-200y can be searched in parallel and the keys can be matched. The route search algorithm can include logic to find a route stored at any of the possible alternate locations, using the additional information stored with each route as described earlier. An aggregator 406 can aggregate the match results from all the routing tables 200a-200y and can provide the longest prefix match from all the results. The longest prefix match may be in any of the eight possible buckets. This can provide the LPM match for any given input packet.

Figure 5:
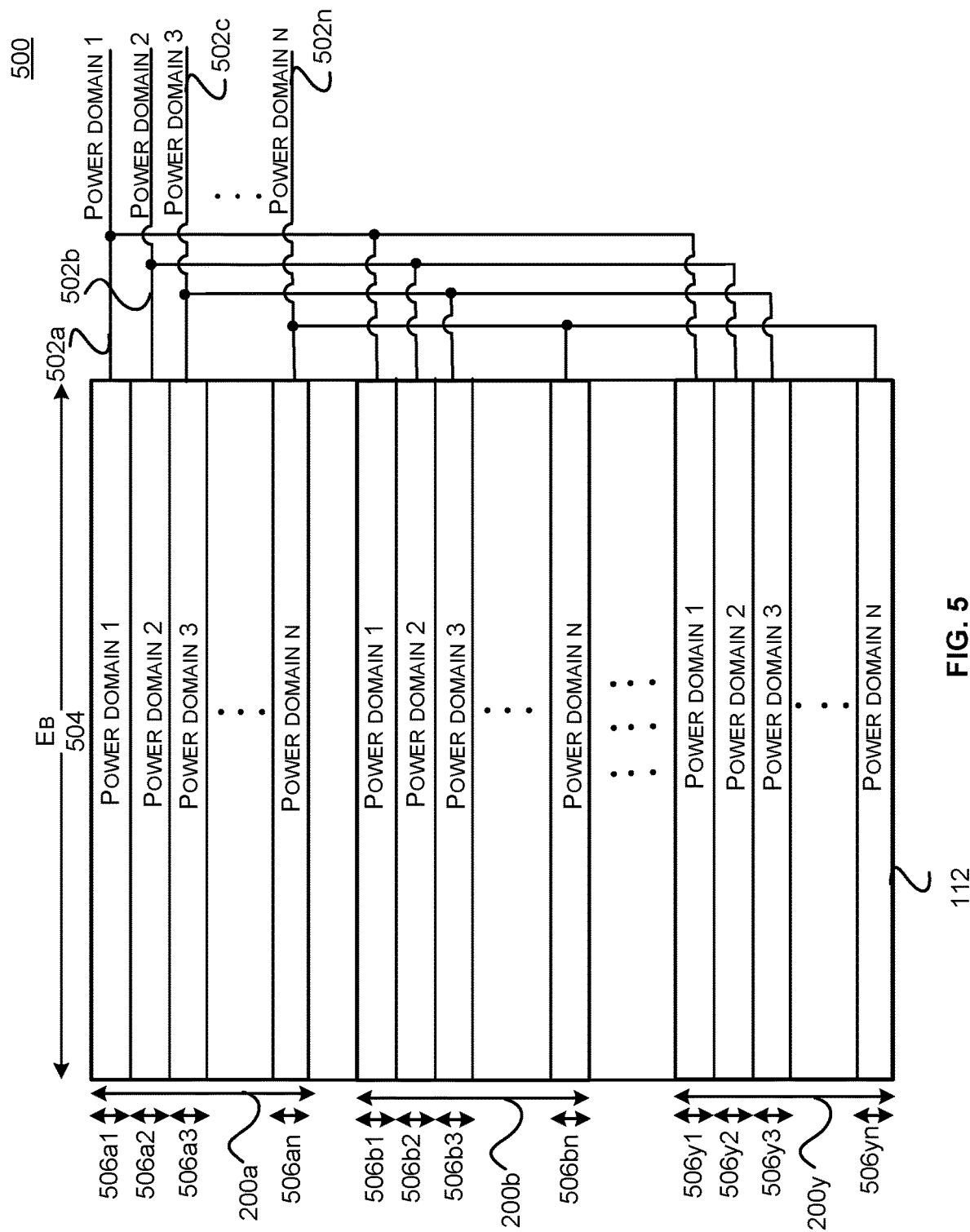
FIG. 5 illustrates an implementation of the routing table with different power domains, in accordance with one embodiment of the disclosed technologies.

FIG. 5 illustrates an implementation of the routing table 112, in accordance with one embodiment of the disclosed technologies.

As illustrated in the figure, the routing table 112 may include the plurality of routing tables 200a-200y. Each routing table may include buckets at successive indices. For example, each set of B buckets in each respective routing table may be at the successive indices. In some embodiments, each of the plurality of routing tables 200a-200y may include multiple sets of buckets. For example, the routing table 200a may include a first set of buckets 506a1, a second set of buckets 506a2, a third set of buckets 506a3 and an Nth set of buckets 506an. Similarly, the routing table 200b may include a first set of buckets 506b1, a second set of buckets 506b2, a third set of buckets 506b3 and an Nth set of buckets 506bn. The routing table 200y may include a first set of buckets 506y1, a second set of buckets 506y2, a third set of buckets 506y3 and an Nth set of buckets 506yn. Each set of buckets may include B buckets. For example, each of the sets 506a1-506an may include B buckets, each of the sets 506b1-506bn may include B buckets and each of the sets 506y1-506yn may include B buckets. Each bucket in each of the first set of buckets 506a1, 506b1, . . . , 506y1, may be at a same respective index in each respective routing table. Each bucket in each of the second set of buckets 506a2, 506b2, . . . , 506y2, may be at a same respective index in each respective routing table. Each bucket in each of the third set of buckets 506a3, 506b3, . . . , 506y3, may be at a same respective index in each respective routing table. Each bucket in each of the Nth set of buckets 506an, 506bn, . . . , 506yn, may be at a same respective index in each respective routing table. In some implementations, each bucket from the B buckets may include Eb entries 504.

In some embodiments, buckets at a same index in each respective routing table can be associated with a same power domain from a plurality of power domains. For example, each bucket from a first set of B buckets at respective indices in each of the routing table 200a, 200b, 200y may be associated with a first power domain, each bucket from a second set of B buckets at respective indices in each of the routing table 200a, 200b, . . . , 200y may be associated with a second power domain, and each bucket from a third set of B buckets at respective indices in each of the routing table 200a, 200b, . . . , 200y may be associated with a third power domain, and so on.

As illustrated in the figure, a power domain 1 502a may be associated with the first set of buckets 506a1 from the routing table 200a, the first set of buckets 506b1 from the routing table 200b, the first set of buckets 506y1 from the routing table 200y, etc. Similarly, a power domain 2 502b may be associated with the second set of buckets 506a2 from the routing table 200a, the second set of buckets 506b2 from the routing table 200b, the second set of buckets 506y2 from the routing table 200y, etc. A power domain 3 502c may be associated with the third set of buckets 506a3 from the routing table 200a, the third set of buckets 506b3 from the routing table 200b, the third set of buckets 506y3 from the routing table 200y, etc. A power domain N 502n may be associated with the Nth set of buckets 506an from the routing table 200a, the Nth set of buckets 506bn from the routing table 200b, the Nth set of buckets 506yn from the routing table 200y, etc. Each of the Eb, Y, B, and N can be positive integers. In one implementation, Eb can be 14, Y can be 8, B can be 128, and N can be 8, e.g., the routing table 112 can include 8 routing tables, each routing table can have 8 sets of buckets, each set of buckets can have 128 buckets, each bucket can have 14 entries. Each power domain from the 8 power domains may be associated with each set of buckets (e.g., 128 buckets) from the 8 sets of buckets for each routing table out of the 8 routing tables. Thus, each power domain may be associated with 128×8 buckets or 128×8×14 entries.

In some embodiments, each of the routing tables 200a-200y may be implemented using a hash table. Hash tables, by their very definition, can have probabilistic route distribution, in the sense that the hash tables may not be filled to full capacity in most instances. Hence, it is a common practice to build a hash table with over capacity to compensate for unfilled entries. In some implementations, an occupancy constant (Ko) can be determined based on simulations by inserting various route samples in the routing table. As an example, the occupancy constant can be "0.68" for an insertion algorithm for a specific network device, as discussed with reference to FIGS. 3 and 4. The occupancy constant can be used to calculate over-capacity. For example, an estimation of the number of entries required to accommodate 100 routes can be calculated as (100/0.68=146). A lower value of the occupancy constant can be used for a further defensive estimation of the over-capacity calculation.

According to the embodiments, a power domain configuration from a plurality of power domain configurations may be associated with a number of power domains from the power domains 1-N. The number of power domains for each power domain configuration may be different from other power domain configurations. In some embodiments, each successive power domain configuration from the plurality of successive power domain configurations may include an additional power domain than a prior power domain configuration. For example, a first power domain configuration may be associated with one power domain (e.g., power domain 1 502a), a second power domain configuration may be associated with two power domains (e.g., the power domain 1 502a and the power domain 2 502b), and a third power domain configuration may be associated with three power domains (e.g., the power domain 1 502a, power domain 2 502b and the power domain 3 502c), and so on. According to some embodiments, each successive power domain configuration can support a higher number of network routes than the prior power domain configuration. For example, the second power domain configuration may support a higher number of network routes than the first power domain configuration, and the third power domain configuration may support even a higher number of network routes than the second power domain configuration. The number of network routes supported by each power domain configuration can be predetermined or can be computed dynamically.

In accordance with some embodiments, each power domain from the power domains 1-N can be turned on or turned off independently from one other. Enabling a power domain can indicate that the capacity of the routing table 112 has increased by the number of buckets associated with that power domain. Similarly, disabling a power domain can indicate that the capacity of the routing table 112 has decreased by the number of buckets associated with that power domain. For example, enabling of the power domain 2 502b may indicate that the capacity of the routing tables 112 has increased by K×N number of buckets. Similarly, disabling the power domain 2 502b may indicate that the capacity of the routing tables 112 has decreased by K×N number of buckets. For example, enabling or disabling a power domain may add or remove the same number of buckets in each routing table. In accordance with the embodiments, a power domain configuration can be switched to another power domain configuration dynamically to perform power scaling based on the varying load conditions. Further, SRAM implementation of the hash tables can allow independent power-on and power-off capability for different power domains. For example, in some implementations, each power domain can be implemented using a separate SRAM module and can be controlled independently.

According to some embodiments, the number of power domains that can be enabled or disabled to maintain the configuration that can support the total number of required entries for a given number of total routes can be determined. Accordingly, various power domain configurations associated with different numbers of power domains can be determined. The number of power domains for each power domain configuration may be different from other power domain configurations to allow vertical scaling of the power domains. In some implementations, each power domain configuration can be represented by a corresponding configuration identifier (Cf) and a route capacity (Rc). For example, the configuration identifier may be used to identify a power domain configuration from the plurality of power domain configurations, e.g., a first power domain configuration, a second power domain configuration, etc.

In some implementations, the plurality of power domain configurations can be represented as {Cf1, Rc1}, {Cf2, Rc2}, . . . , and {Cfn, Rcn}. For example, the first power domain configuration identified by Cf1 can support route capacity from 0 to Rc1, the second power domain configuration identified by Cf2 can support route capacity from Rc1 to (Rc2-1), and an nth power domain configuration identified by Cfn can support route capacity from ((Rcn-1)+1) to Rcn. Hence, each successive power domain configuration can support a higher number of network routes than the prior power domain configuration. The route capacity may be determined in terms of a total number of physical entries "E" supported by each power domain configuration. In one embodiment, the route capacity for a power domain configuration can be predetermined by populating the routing tables using field data (e.g., route samples from field deployments) and by running simulation models. In another embodiment, the route capacity for a power domain configuration can be dynamically computed, e.g., based on types of network routes at a certain point in time, types of prefixes, number of VRF-IDs, number of requests for insertion of new network routes in the routing tables, migration algorithms, etc.

In some implementations, a total number of buckets supported by various power domain configurations can be represented using {B1, B2, . . . , Bn}. If total entries per bucket are represented by Eb, the number of physical entries "E" supported by each power domain configuration "Cf" can be represented using: {(Cf1, (B1×Eb×N)), (Cf2, (B2×Eb×N)), . . . , (Cfn, (Bn×Eb×N))}. For example, with B=128, and N=8, the total number of buckets supported by various power domain configurations can be represented by {128, 256, 384, 512, 640, 768, 896, 1024}. The route capacity, in terms of number of physical entries, supported by each power domain configuration can be represented using: {(Cf1, 14336), (Cf2, 28672), (Cf3, 43008), (Cf4, 57344), (Cf5, 71680), (Cf6, 86016), (Cf7, 100352), (Cf8, 114688)}. Referring back to FIG. 1, various configuration identifiers {Cf1, Cf2, . . . , Cfn} and the route capacity "E" for various power domain configurations can be stored in the memory 108, e.g., in the configuration registers 110 or using a suitable data structure.

Generally, for a specific deployment scenario, a total number of routes "T" that can be supported by a network device is known. In some implementations, a total number of physical entries "E" for the given total number of routes "T" can be calculated using the occupancy constant Ko, as shown by an equation 1:

$$E = (T \times (1/Ko)),$$ Equation 1

In some embodiments, a current power domain configuration at power-up or system reset can be determined by determining the route capacity required by the current power domain configuration in terms of the total number of physical entries "E" for the given number of routes "T." As an example, for a network device, with T=64K, B=8K, and Ko=0.68, $$E = (64 \times 1024) \times (1/0.68) = 96376.$$

Based on the route capacity supported by each power domain configuration as discussed above, Cf7 can be selected as the current power domain configuration, since Cf7 can support higher number of entries (e.g., "100352") than the route capacity required at power-up (e.g., "96376").

Figure 6:
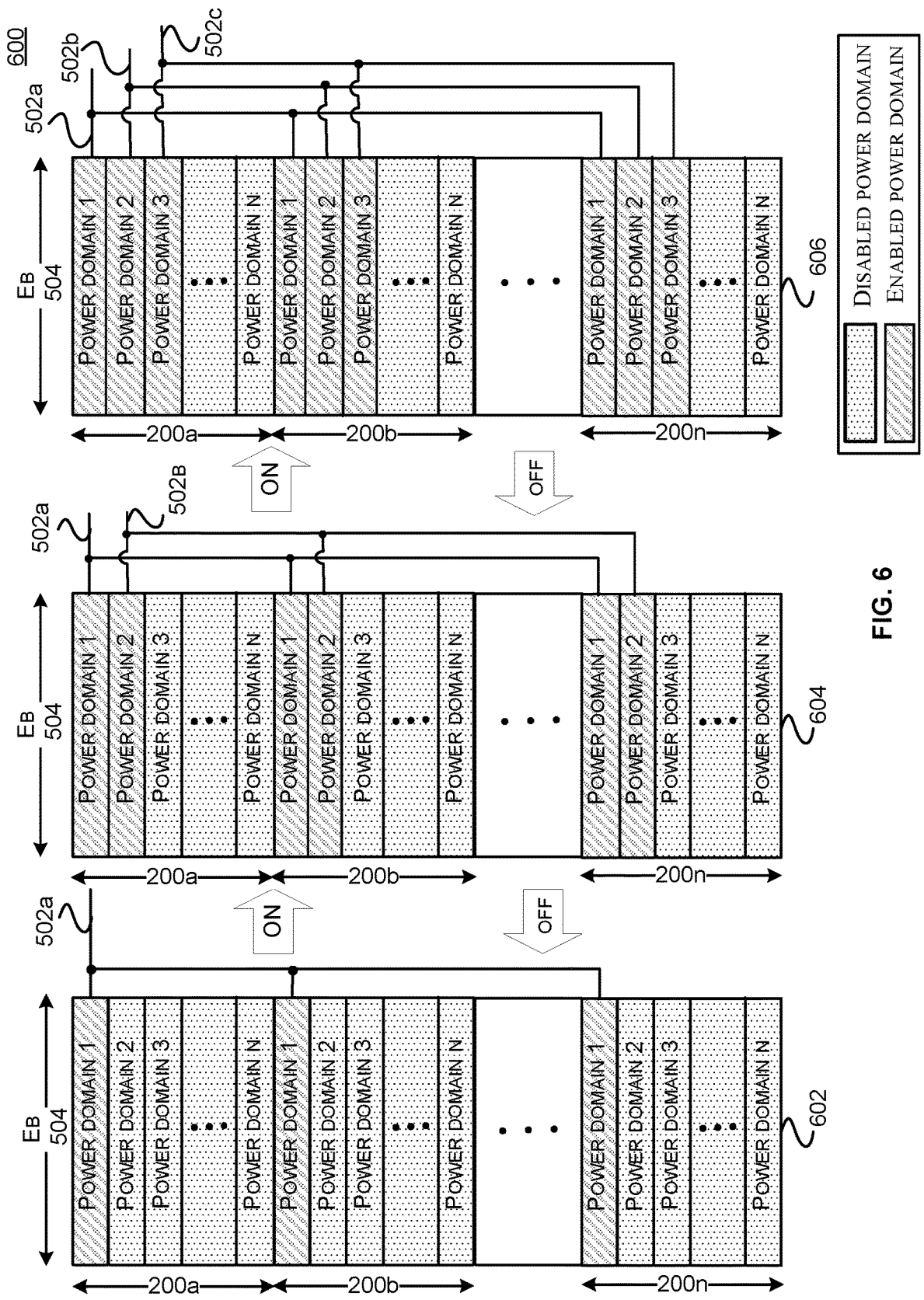
FIG. 6 illustrates power domain configurations of the routing table for power management using vertical scaling, in accordance with one embodiment of the disclosed technologies.

FIG. 6 illustrates different power domain configurations 600 of the routing table 112 for power management using vertical scaling, in accordance with one embodiment of the disclosed technologies.

FIG. 6 illustrates successive power domain configurations 602, 604 and 606. According to the embodiments, the number of power domains for each power domain configurations 602, 604, 606 can be different from other power domain configurations. For example, the power domain configuration 602 can include one enabled power domain power domain 1 502a. The power domain configuration 604 can include two enabled power domains, e.g., the power domain 1 502a and the power domain 2 502b. The power domain configuration 606 can include three enabled power domains, e.g., the power domain 1 502a, power domain 2 502b and the power domain 3 502c. In accordance with the embodiments, a power domain configuration can be switched to another power domain configuration by enabling or disabling a power domain. For example, the power domain configuration 602 can be switched to the power domain configuration 604 and the power domain configuration 604 can be further switched to the power domain configuration 606 for increasing load requirement (e.g., higher number of routes). As discussed with reference to FIG. 5, enabling a power domain can add a set of buckets to each hash table, thus increasing the overall capacity of the routing table 112 to store route entries. Similarly, the power domain configuration 606 can be switched to the power domain configuration 604 and the power domain configuration 604 can be further switched to the power domain configuration 602 for decreasing load requirement (e.g., lower number of routes). As discussed with reference to FIG. 5, disabling a power domain can remove a set of buckets from each hash table, thus decreasing the power consumption by the routing table.

Figure 7:
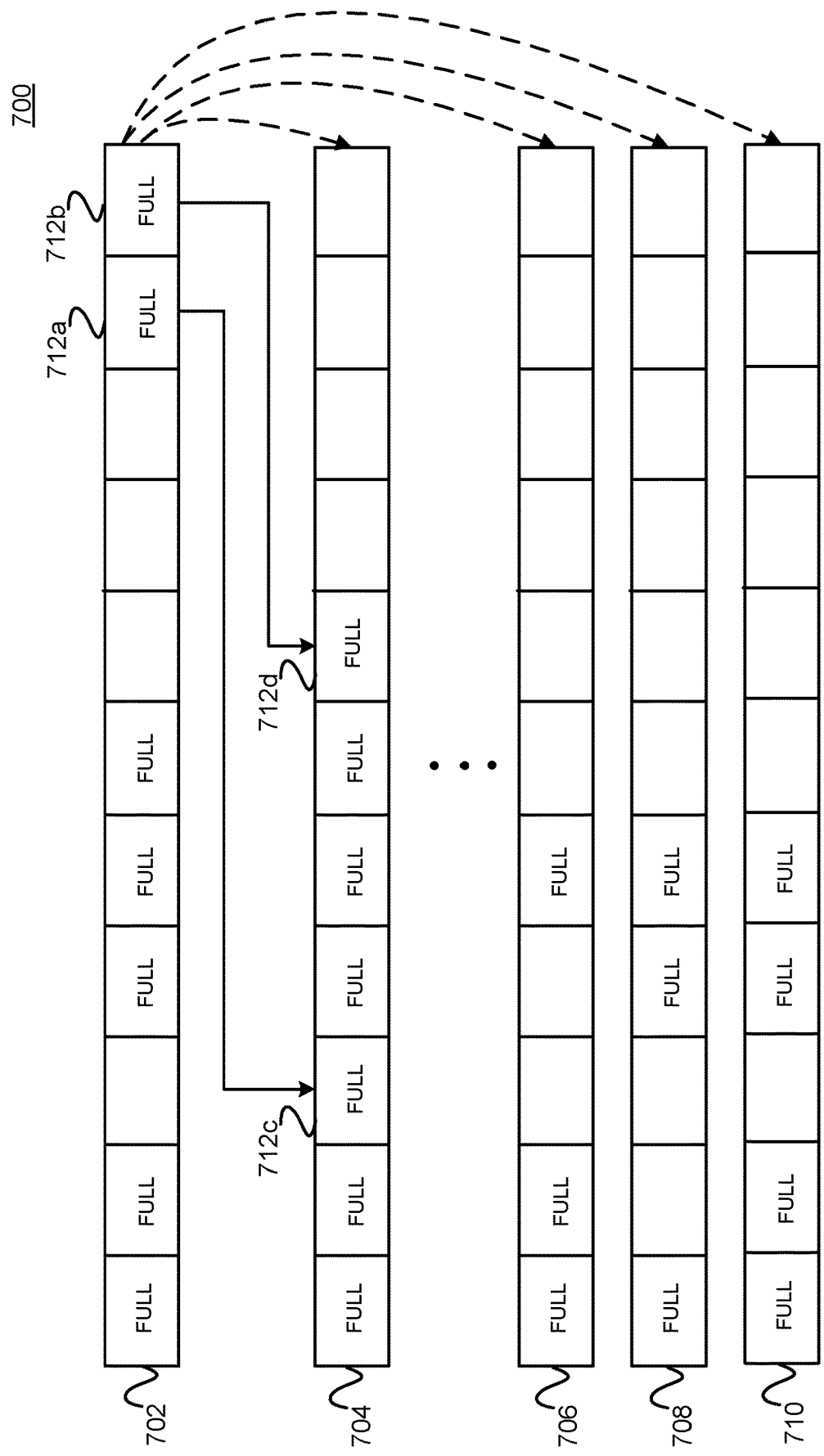
FIG. 7 illustrates a method for migration of entries to different buckets, in accordance with one embodiment of the disclosed technologies.

FIG. 7 illustrates a method 700 for migration of entries to different buckets, in accordance with one embodiment of the disclosed technologies.

In one embodiment, buckets 702, 704, 706, 708 and 710 may be associated with different power domains. Each of the buckets 704, 706, 708 and 710 may be eligible to be migration candidates. In some implementations, buckets indexed with other DLP prefix hash values can be eligible to be migration candidates, as discussed with reference to FIG. 3. For example, each of the buckets 704, 706, 708 and 710 may be associated with a lower power domain that can be used for migration of entries 712a and 712b. As shown in the figure, the entries 712a and 712b can be moved to locations 712c and 712d respectively in the bucket 704. For example, referring back to FIG. 5, the current domain configuration may include power domain 1 502 and the power domain 2 502b, and the bucket 702 can correspond to the set of buckets 506a1. As an example, each of the buckets 704, 706, 708 and 710 can correspond to the set of buckets 506a1, 506b1, ..., 506y1, which can be associated with the power domain 1 502a. Thus, the entries 712a and 712b can be migrated to the lower power domain configuration by migrating to either of the set of buckets 506a1, 506b1, ..., 506y1. Once the entries are migrated to the next lower power domain, the higher power domain can be disabled to save power.

In one embodiment, migration of the entries may include copying the entry to the new location. For example, the data stored in the entries 712a and 712b can be copied in the new locations 712c and 712d. In some instances, the same data may be available in both the locations for a period of time until the power domain associated with the old location is disabled or the entries are removed.

In one embodiment, a method for enabling a power domain can be executed when a request to insert a new route is received. For example, a computer implemented method may comprise receiving, by a network device, a request to store data associated with a new network route in a routing table, wherein the routing table is stored in a memory. The routing table may comprise hash tables. Each hash table may comprise buckets at successive indices, wherein buckets at a same index in each respective hash table are associated with a same power domain from a plurality of power domains. Each bucket may comprise entries to store data associated with network routes. The memory may also be configured to store a plurality of power domain configurations, wherein each power domain configuration may be associated with a respective number of power domains from the plurality of power domains, and a respective number of network routes supported by the power domain configuration. The respective number of power domains for each power domain configuration may be different from other power domain configurations. The network device may be configured to determine that, for a current power domain configuration, a total number of network routes including the new network route is more than a number of network routes supported by the current power domain configuration. The network device may further be configured to switch to a higher power domain configuration that supports a higher number of network routes than the current power domain configuration by enabling an additional power domain associated with the higher power domain configuration. A method to enable a power domain is further explained with the help of FIG. 8.

Figure 8:
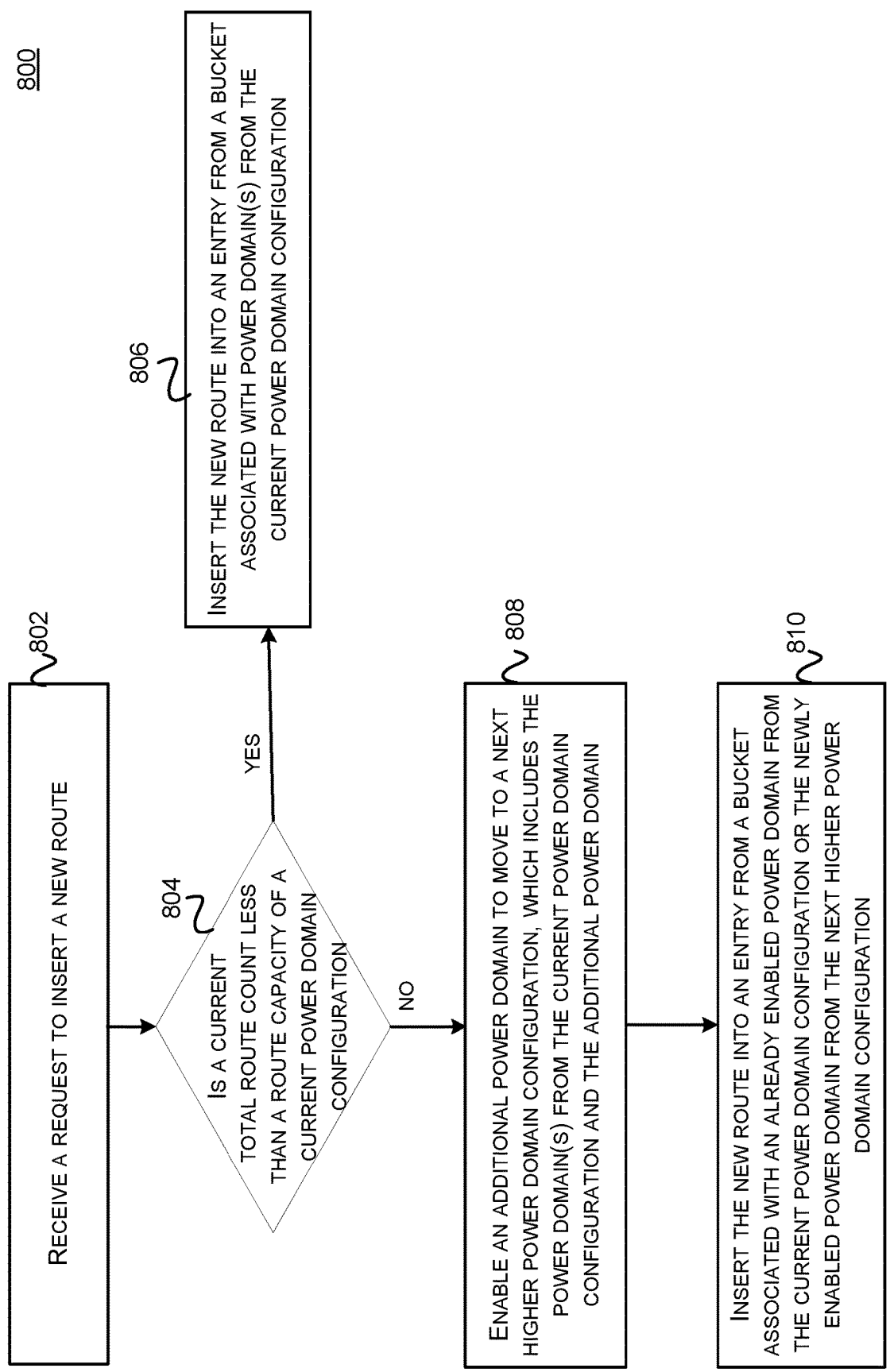
FIG. 8 illustrates a method for enabling a power domain, in accordance with one embodiment of the disclosed technologies.

FIG. 8 illustrates a method 800 for enabling a power domain, in accordance with one embodiment of the disclosed technologies. The method 800 can be executed by the power domain controller 114. For example, the power domain controller 114 may execute the method 800 during runtime to perform power management based on the dynamic load conditions, e.g., as new routes are received or removed from the routing table 112.

In step 802, a request to insert a new route may be received. Referring back to FIG. 1, the request may be received by the power domain controller 114 to store data for the new route in the routing table 112. In some embodiments, receiving a request to insert a new route can trigger a new domain power-on algorithm as described using the method 800. As an example, the current power domain configuration may be a first power domain configuration, identified by Cf1, which may be associated with the power domain 1 502a, as discussed with reference to FIG. 5. The current power domain configuration may be determined at a power up of the network device 100.

In step 804, it is determined if a current total route count is less than a route capacity of a current power domain configuration. For example, the power domain controller 114 may determine if the total number of routes currently programmed in the routing table 112 is less than the route capacity of the current power domain configuration. As discussed with reference to FIG. 5, the route capacity of the first power domain configuration Cf1 may be determined in terms of the total number of physical entries "E" based on the given number of routes "T" including the new route, and the total number of buckets supported by the first power domain configuration.

In step 806, if the total number of current routes is less than the route capacity of the current power domain configuration, it may indicate that the routing table 112 has enough capacity to accommodate the new route. Thus, the new route can be inserted into an entry from a bucket associated with the power domain(s) from the current power domain configuration. For example, the data for the new route can be inserted into one of the unoccupied entries from any of the sets of buckets associated with the power domain 1 502a. The new route can be inserted using the route insertion method as discussed with reference to FIG. 3 or any other suitable method.

As discussed with reference to FIG. 3, computation of a bucket index inside each of the routing tables 200a-200y can be done using a maximum possible number for the bucket capacity based on a maximum physical bucket count possible. If a current bucket count per routing table for the current power domain configuration is lower than the maximum physical capacity, then a new bucket index for the new route entry can determined by rounding the bucket index value by the factor equal to current hash table bucket capacity (RFcurr) compared to maximum possible bucket capacity. Both the rounded-down index and the original index based on the maximum-physical-index can be stored in each corresponding entry location.

As an example, maximum bucket capacity for each hash table can be 1K (8×128=1024) but current power domain configuration can only enable 128 entries per hash table. Thus, the hash table bucket index can be calculated using 1024 as the total capacity but the value can be rounded down using a modulo 128 (Rfcurr=128) operation, where Rfcurr indicates the current capacity associated with the power domain 1 502a, based on the current power domain configuration. Both the rounded-down index and the original index can be stored in the entry. For example, if the bucket index is 500, the current index can be calculated to be ((500% 128)=116)=116. Thus, both the indices (e.g., 116 and 500) can be stored in the entry.

In step 808, the power domain controller 114 may enable an additional power domain to switch to a next higher power domain configuration that can support a higher number of network routes than the current power domain configuration. Thus the next higher power domain configuration may include the power domain(s) associated with the current power domain configuration, and the newly enabled power domain. According to some embodiments, the power domain 2 502b may be enabled to switch to the next higher power domain configuration. For example, the next higher power domain configuration may be a second power domain configuration that may be associated with the power domain 1 502a and the power domain 2 502b, and thus can have a higher route capacity than the current power domain configuration. The second power domain configuration may increase the total bucket capacity of each hash table by the number of buckets added by the newly enabled power domain. For example, referring back to FIG. 5, addition of the power domain 2 502*b* may increase the number of buckets for the routing table 200*a* by the buckets 506*a*2, for the routing table 200*b* by the buckets 506*b*2, for the routing table 200*y* by the buckets 506*y*2, etc.

All the hash functions and the LPM search functions, as discussed with reference to FIG. 3 and FIG. 4, may be automatically updated to take into account the higher number of buckets in each hash table with the addition of the power domain 2 502*b*. Since the original indices stored in the entries were determined using a current modulo rounding factor (RFcurr) based on the route capacity of the associated power domain (e.g., 128 for the power domain 1 502*a*) of the current power domain configuration, new indices may need to be determined to take into consideration the higher routing capacity of the additional power domain (e.g., 256 for the power domain 1 502*a* and the power domain 2 502*b*). In some embodiments, a new modulo rounding factor (RFnew) can be calculated based on the size of each hash table after addition of the power domain 2 502*b*. For example, if the route capacity of each hash table is increased from 128 to 256, the new modulo rounding factor RFnew is calculated to be 256. In some embodiments, entries that include an index greater than the current modulo rounding factor (RFcurr) (e.g., (original index % RFnew) >RFcurr) can be migrated to a new bucket at an index determined using the new modulo rounding factor RFnew, based on the route insertion method as discussed with reference to FIG. 3. In some implementations, migration of an entry may include copying the entry to a new index as discussed with reference to FIG. 7.

In step 810, the new route can be inserted into an entry from a bucket associated with already enabled power domain(s) from the current power domain configuration or the newly enabled power domain(s) from the next higher power domain configuration. For example, as discussed with reference to FIG. 5, there may be empty entries associated with the already enabled power domains since the routing tables were designed using the over capacity factor Ko. The second power domain configuration may increase the total bucket capacity of each hash table by the number of buckets added by the newly enabled power domain. Referring back to FIG. 5, addition of the power domain 2 502*b* may increase the number of buckets for the routing table 200*a* by the buckets 506*a*2, for the routing table 200*b* by the buckets 506*b*2, and so on. The new route can be inserted using the route insertion method as discussed with reference to FIG. 3 or any other suitable method.

After the new route is inserted in the routing table, the migrated entries can be deleted from the original location represented by the original indices.

In one embodiment, a computer implemented method may comprise determining, by a network device, that, for a current power domain configuration from a plurality of power domain configurations, a total number of network routes is less than a threshold for a lower power domain configuration from the plurality of power domain configurations. The plurality of power domain configurations may be stored in a memory. Each power domain configuration may be associated with a respective number of power domains from a plurality of power domains, and a respective number of network routes supported by the power domain configuration. The respective number of power domains for each power domain configuration may be different from other power domain configurations. The memory may also be configured to store a routing table. The routing table may comprise hash tables. Each hash table may comprise buckets at successive indices, wherein buckets at a same index in each respective hash table are associated with a same power domain from the plurality of power domains. Each bucket may comprise entries to store data associated with network routes. The network device may be configured to identify buckets from each hash table that correspond to a power domain from the current power domain configuration, which is not part of the lower power domain configuration. The network device may further be configured to migrate entries from the identified buckets to buckets that correspond to a power domain associated with the lower power domain configuration and switch to the lower power domain configuration by transitioning the power domain from the current power domain configuration to a lower power state. A method to disable a power domain is further explained with the help of FIG. 9.

Figure 9:
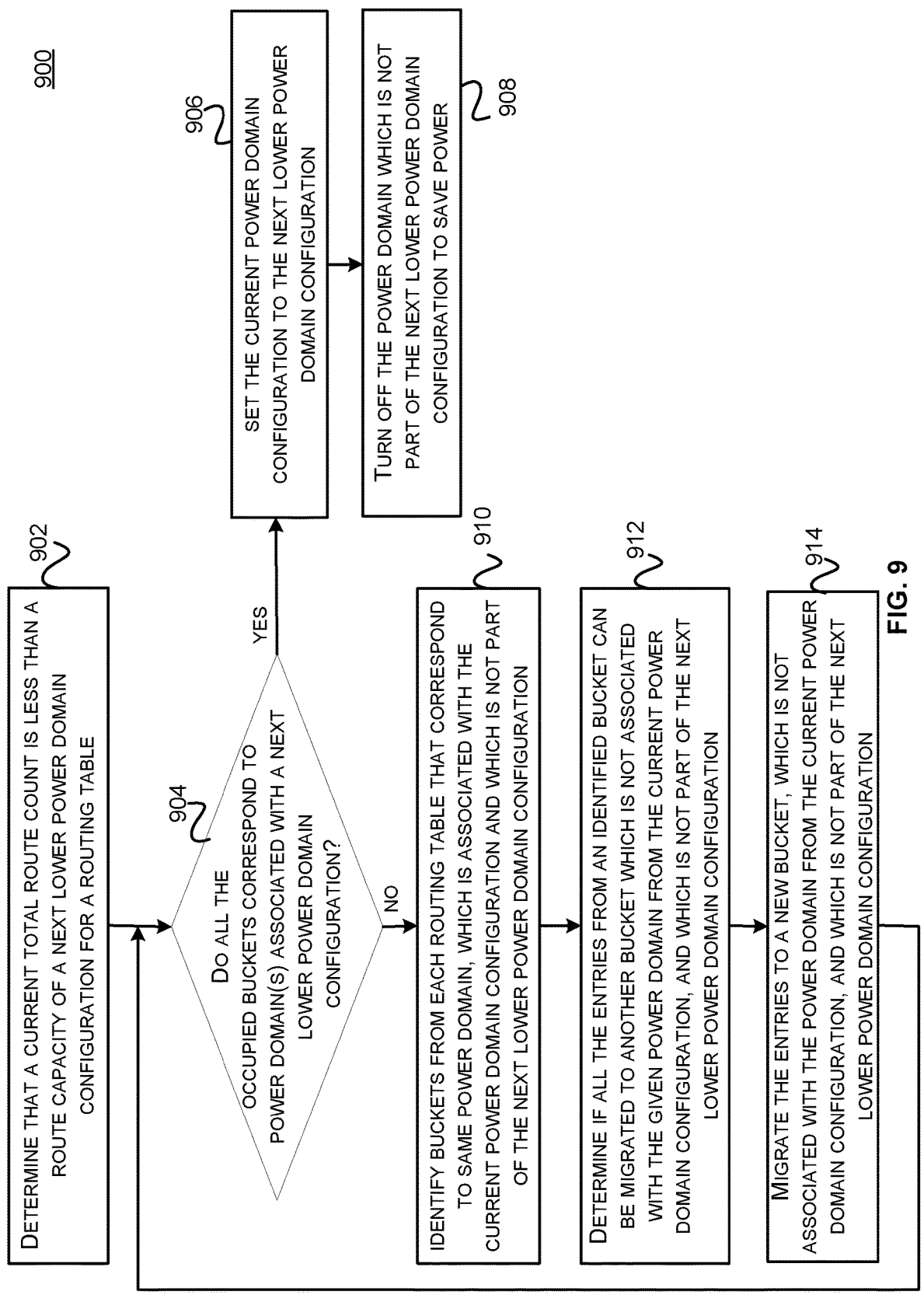
FIG. 9 illustrates a method for disabling a power domain, in accordance with one embodiment of the disclosed technologies.

FIG. 9 illustrates a method 900 for disabling a power domain, in accordance with one embodiment of the disclosed technologies.

In step 902, it can be determined if a current total route count is less than a route capacity of a next lower power domain configuration. For example, in some implementations, the power domain controller 114 can determine if a total number of routes in the current power domain configuration is less than the route capacity of a next lower power domain configuration. Referring back to FIG. 5, as an example, the current power domain configuration can be the second power domain configuration. For example, the power domain 1 502*a*1 and the power domain 2 502*a*2 may be enabled in the second power domain configuration. The next lower power domain configuration may be the first power domain configuration, which may only have the power domain 1 502*a*1 enabled. As discussed earlier, the route capacity of the first power domain configuration (Rc1) may be less than the route capacity of the second power domain configuration (Rc2). If the current total route count is less than the route capacity of the first power domain configuration, it may be possible for the first power domain configuration to accommodate the current number of routes, which can be determined by reviewing the routing tables 112.

In step 904, it can be determined if all the occupied buckets correspond to power domain(s) associated with the next lower power domain configuration. For example, in some implementations, the power domain controller 114 can determine if all the occupied buckets in the routing table 112 only have entries in the power domain 1 502*a*1 associated with the first power domain configuration. Referring back to FIG. 5, all the occupied buckets may be part of the buckets 506*a*1, 506*b*1, . . . , 506*y*1, corresponding to the routing tables 200*a*, 200*b*, . . . , 200*y*.

In step 906, if all the occupied buckets correspond to the power domain(s) associated with the next lower power domain configuration, set the current power domain configuration to the next lower power domain configuration. For example, the power domain controller 114 may switch the current power domain configuration to the first power domain configuration from the second power domain configuration.

In step 908, the power domain which is not part of the next lower power domain configuration can be turned off to save power. Referring back to FIG. 5, the power domain 2 502*b*, which is not part of the first power domain configuration, can be disabled to save power.

In step 910, the power domain controller 114 may identify buckets from each routing table that correspond to the same power domain, which is associated with the current power domain configuration and which is not part of the next lower power domain configuration. Referring back to FIG. 5, the buckets which have entries associated with the power domain 2 502b can be identified. For example, the buckets from the sets of buckets 506a2, 506b2, . . . , 506y2, which are associated with the power domain 2 502b, can be identified. In some embodiments, a new rounding factor RFnew can be set for route insertion based on the new hash table capacity due to disabling of the power domain 2 502b. For example, if the RFcurr based on the second power domain configuration was 256, the RFnew can be set to 128 based on the first power domain configuration.

In step 912, the power domain controller 114 may determine if all the entries from the identified bucket can be migrated to another bucket which is not associated with the given power domain from the current power domain configuration, and which is not part of the next lower power domain configuration. Referring back to FIG. 5, the power domain controller 114 can determine if all the entries from an identified bucket which is associated with the power domain 2 502b can be migrated to another bucket which is associated with the power domain 1 502a.

In step 914, the entries from the identified bucket can be migrated to another bucket which is not associated with the power domain from the current power domain configuration, and which is not part of the next lower power domain configuration. Referring back to FIG. 5, entries from the identified bucket which is associated with the power domain 2 502b can be migrated to another bucket which is associated with the power domain 1 502a. An entry can be migrated from one bucket to another bucket as discussed with reference to FIG. 7. For example, migration of the entry may include copying or reinserting the entry in another bucket using a new index. In some embodiments, the RFnew calculated based on the lower route capacity can be used as the rounding factor to calculate the new bucket index in the route insertion algorithm as discussed with reference to FIG. 3.

The steps 904, 910, 912 and 914 can be repeated for all the identified buckets, which correspond to the power domain from the current power domain configuration, which is not part of the next lower power domain configuration. Once all the entries corresponding to the buckets associated with the power domain, which is associated with the current power domain configuration, and which is not part of the next lower power domain configuration, have been migrated and all the occupied buckets correspond to power domain(s) associated with the next lower power domain configuration, the steps 906 and 908 can be executed. For example, the power domain controller 114 may switch to the power domain configuration 1 and disable the power domain 0 502a to save power.

Various embodiments of the disclosed technologies can allow dynamic power scaling of the power domains based on real-time load conditions in a network device. Hash table implementation of the routing table can allow random insertion of a route entry in contrast to TCAMs which can be restricted to ordering dependency. The SRAMs used for implementing the routing table can be turned on or turned off independently for different power domains. Vertical scaling can allow addition or removal of a fixed number of buckets across the routing table. The flexibility to enable or disable a power domain during runtime can provide an efficient method of power reduction as compared to traditional devices which may require rebooting of the device for different power configurations and load requirements. Thus, embodiments can provide power reduction with minimum system overhead.

Figure 10:
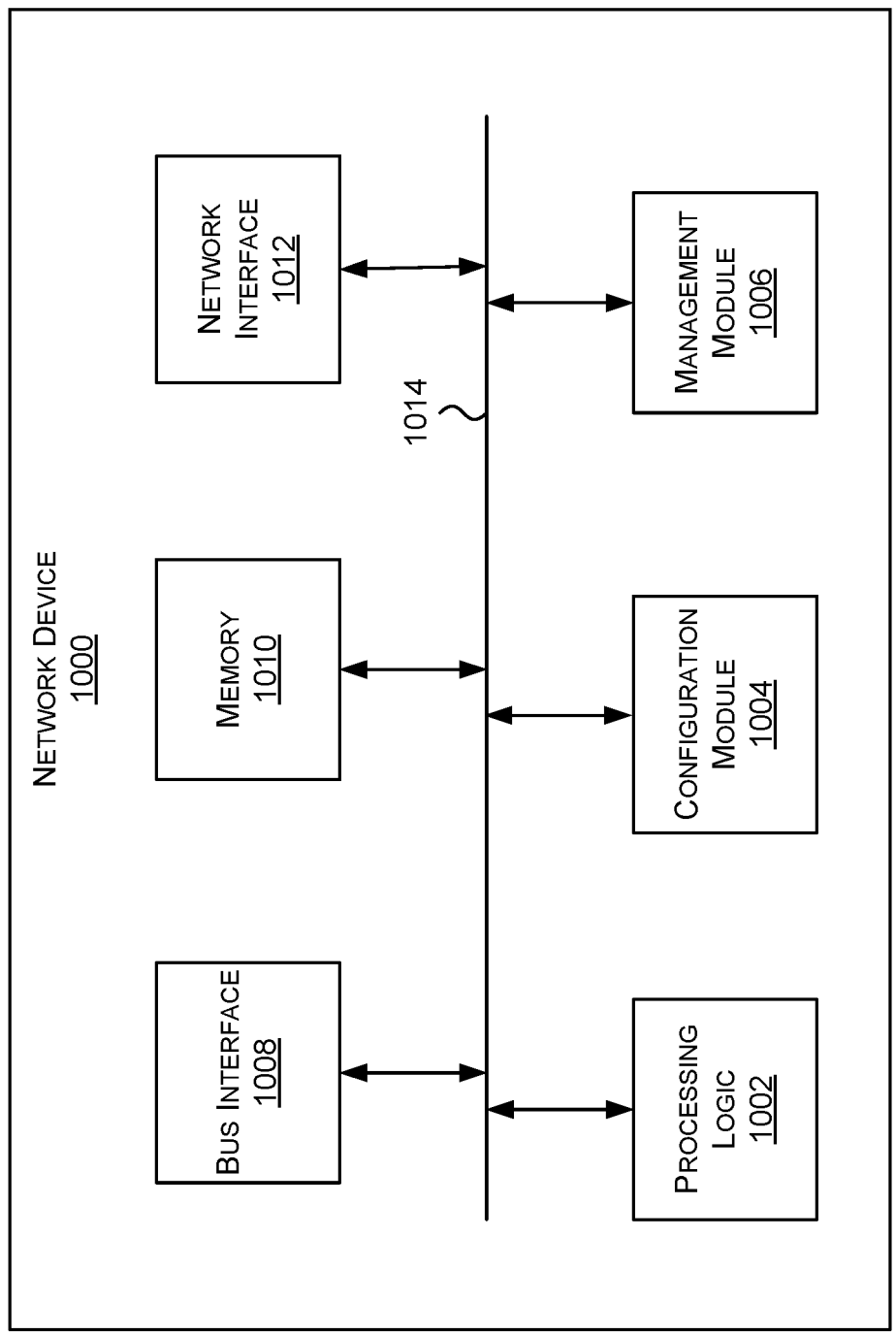
FIG. 10 illustrates an example architecture for features and systems described herein that includes one or more service provider computers and/or a user device connected via one or more networks, according to some embodiments.

FIG. 10 illustrates an example of a network device 1100. Functionality and/or several components of the network device 1000 may be used without limitation with other embodiments disclosed elsewhere in this disclosure, without limitations. In some implementations, the network device 1100 may implement functionality of the network device 100, as discussed with reference to FIG. 1. A network device 1000 may facilitate processing of packets and/or forwarding of packets from the network device 1000 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1000 may be the recipient and/or generator of packets. In some implementations, the network device 1000 may modify the contents of the packet before forwarding the packet to another device. The network device 1000 may be a peripheral device coupled to another computer device, a switch, a router or any other suitable device enabled for receiving and forwarding packets.

In one example, the network device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The network device 1000 may include additional modules, not illustrated here, such as components discussed with respect to the nodes disclosed in FIG. 12. In some implementations, the network device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the network device 1000, while in other cases some or all of the memory may be external to the network device 1000. The memory 1010 may store an operating system comprising executable instructions that, when executed by the processing logic 1002, provides the execution environment for executing instructions providing networking functionality for the network device 1000. In some embodiments, the memory 1010 may include instructions for executing some or all of the functionality of the power domain controller 114. The memory may also store and maintain several data structures and routing tables for facilitating the functionality of the network device 1000. For example, the memory 1010 may store the routing tables 112, as discussed with reference to FIG. 5.

In some implementations, the configuration module 1004 may include one or more configuration registers. Configuration registers may control the operations of the network device 1000. In some implementations, one or more bits in the configuration register can represent certain capabilities of the network device 1000. In some embodiments, the configuration module 1004 may include the configuration registers 110, as discussed with reference to FIG. 1. Configuration registers may be programmed by instructions executing in the processing logic 1002, and/or by an external entity, such as a host device, an operating system executing on a host device, and/or a remote device. The configuration module 1004 may further include hardware and/or software that control the operations of the network device 1000.

In some implementations, the management module 1006 may be configured to manage different components of the network device 1000. In some cases, the management module 1006 may configure one or more bits in one or more configuration registers at power up, to enable or disable certain capabilities of the network device 1000. In certain implementations, the management module 1004 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium.

The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the network device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1000 may include multiple network interface modules, each configured to communicate with a different network. For example, in these implementations, the network device 1000 may include a network interface module for communicating with a wired Ethernet network, a wireless 802.11 network, a cellular network, an Infiniband network, etc.

The various components and modules of the network device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 11.

Figure 11:
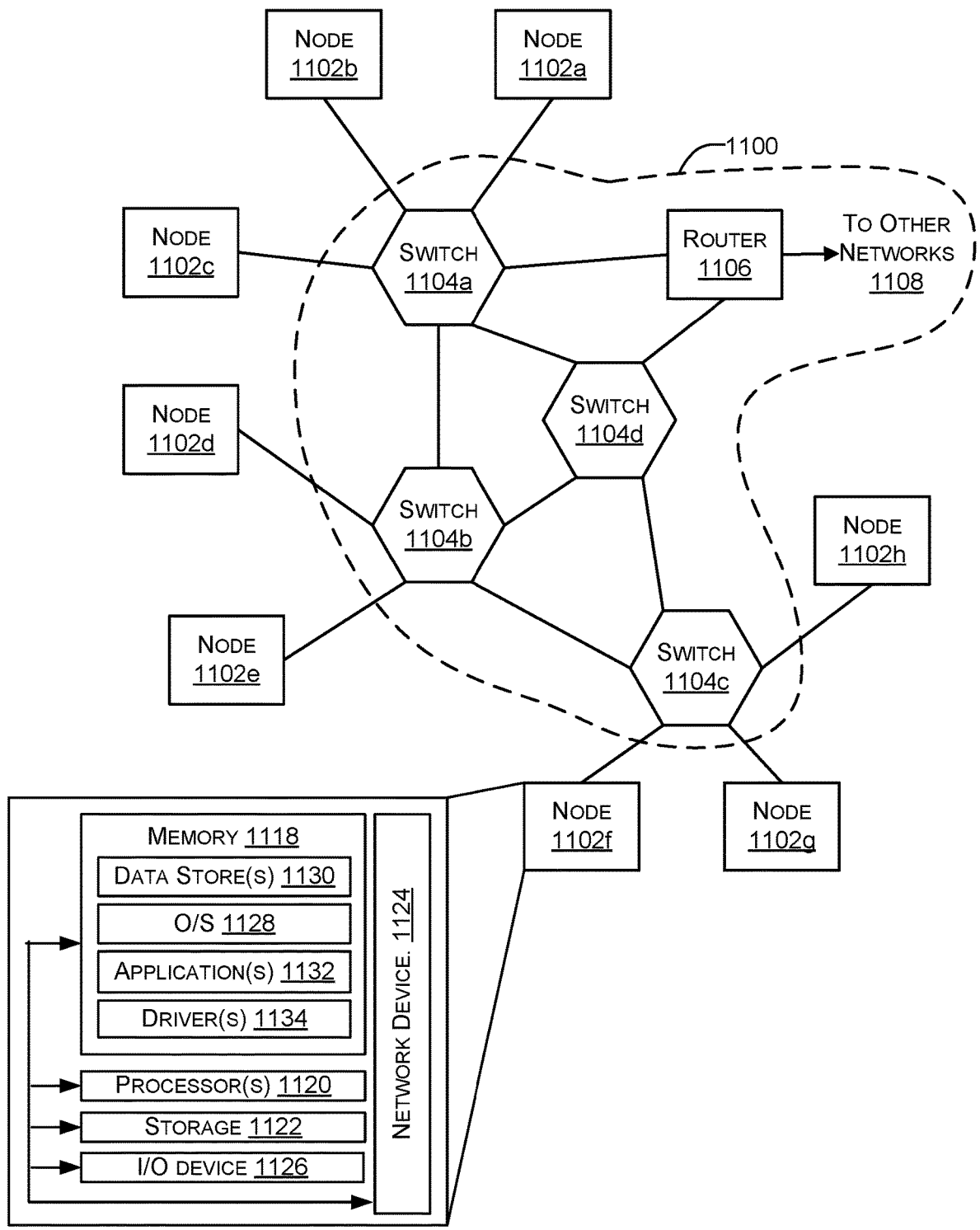
FIG. 11 illustrates aspects of an example environment of a computing system for implementing aspects in accordance with some embodiments.

FIG. 11 illustrates a network 1100, illustrating various different types of network devices 1000 of FIG. 10, such as nodes comprising the network device, switches and routers. In certain embodiments, the network 1100 may be based on a switched architecture with point-to-point links. As illustrated in FIG. 11, the network 1100 includes a plurality of switches 1104a-1104d, which may be arranged in a network. In some cases, the switches are arranged in a multi-layered network, such as a Clos network. A network device 1000 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1104a-1104d may be connected to a plurality of nodes 1102a-1102h and provide multiple paths between any two nodes.

The network 1100 may also include one or more network devices 1000 for connection with other networks 1108, such as other subnets, LANs, wide area networks (WANs), or the Internet, and may be referred to as routers 1106. Routers use headers and forwarding tables to determine the best path for forwarding the packets, and use protocols such as internet control message protocol (ICMP) to communicate with each other and configure the best route between any two devices.

In some examples, network(s) 1100 may include any one or a combination of many different types of networks, such as cable networks, the Internet, wireless networks, cellular networks and other private and/or public networks. Interconnected switches 1104a-1104d and router 1106, if present, may be referred to as a switch fabric, a fabric, a network fabric, or simply a network. In the context of a computer network, terms "fabric" and "network" may be used interchangeably herein.

Nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as, for example, a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices 1104. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1126 that allow the node(s) 1102a-1102h to communicate with a stored database, another computing device or server, user terminals and/or other devices on the network(s) 1100. The network device(s) 1124 of FIG. 11 may include similar components discussed with reference to the network device 1000 of FIG. 10.

In some implementations, the network device 1126 is a peripheral device, such as a PCI-based device. In these implementations, the network device 1126 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1126 may be connected to a computing system using a PCIe interface.

A PCI-based device may include one or more functions. A "function" describes operations that may be provided by the network device 1126. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1126 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are lightweight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer-readable medium and processed by a processor in any of the computer systems described herein. It should be noted that the described processes and architectures can be performed either in real time or in an asynchronous mode prior to any user interaction. The modules may be configured in the manner suggested in FIG. 10, FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
   a memory configured to store routing tables comprising hash tables, each hash table comprising buckets, the buckets of one of the hash tables being associated with multiple power domains such that a first bucket associated with a first power domain within the one of the hash tables is independently controllable to be enabled or disabled from a second bucket associated with a second power domain within the same one of the hash tables, each bucket being configured to store data representing a network route; and
   a power domain controller coupled to the memory, the power domain controller configured to:
      at a first time, determine a number of network routes stored in the buckets associated with a first subset of the multiple power domains; and
      at a second time:
         enable buckets associated with a second subset of the multiple power domains based on the number of network routes; and
         store the number of network routes in at least some of the buckets associated with the second subset of the multiple power domains.

2. The apparatus of claim 1, wherein the memory is further configured to store a plurality of power domain configurations for the routing tables;
   wherein each of the plurality of power domain configurations is associated with a respective number of power domains of the multiple power domains and a route capacity;
   wherein the power domain controller is configured to:
      determine a first power domain configuration from the plurality of power domain configurations based on a relationship between the number of network routes and the route capacity of the first power domain configuration; and
      enable buckets associated with the second subset of the multiple power domains based on the first power domain configuration.

3. The apparatus of claim 2, wherein the power domain controller is further configured to:
   receive data of a first network route to be stored in the routing tables;
   determine a second power domain configuration based on whether the number of network routes is lower than the route capacity of the first power domain configuration;
   enable buckets associated with the second subset of the multiple power domains based on the second power domain configuration;
   select a first entry in a first bucket associated with a first power domain of the first subset of the multiple power domains or in a second bucket associated with a second power domain of the second subset of the multiple power domains; and
   store data of the first network route in the first entry.

4. The apparatus of claim 3, wherein the power domain controller is configured to determine that the second power domain configuration is identical to the first power domain configuration based on the number of network routes being lower than the route capacity of the first power domain configuration; and wherein the first subset of the multiple power domains is identical to the second subset of the multiple power domains.

5. The apparatus of claim 3, wherein the first subset of the multiple power domains includes a first number of enabled power domains; and
wherein the power domain controller is configured to:
determine that the second subset of the multiple power domains includes a larger number of power domains than the first subset of the multiple power domains based on the number of network routes reaching the route capacity of the first power domain configuration; and
enable buckets associated with a first power domain of the multiple power domains in addition to buckets associated with the first subset of the multiple power domains to enable buckets associated with the second subset of the multiple power domains.

6. The apparatus of claim 5, wherein the power domain controller is configured to select the first entry in the bucket associated with the second power domain.

7. The apparatus of claim 5, wherein the power domain controller is configured to select the first entry in the bucket associated with the first power domain based on an over capacity factor.

8. The apparatus of claim 3, wherein the power domain controller is configured to:
determine a first bucket index using a hash function associated with a first hash table of the hash tables;
determine, based on a network address associated with the first network route, a first bucket index;
determine, from the first hash table, a number of buckets of which the associated power domains are enabled based on the first power domain configuration;
determine a second bucket index based on the first bucket index and the number of buckets; and
select the first entry from a bucket of the first hash table, the bucket being associated with the second bucket index.

9. The apparatus of claim 8, wherein the power domain controller is configured to store the first bucket index and the second bucket index in the first entry.

10. The apparatus of claim 8, wherein the second bucket index is determined based on a modulo operation involving a number of entries and the first bucket index.

11. The apparatus of claim 8, wherein the first bucket index is determined based on a prefix included in the network address.

12. The apparatus of claim 2, wherein the first power domain configuration indicates enabling buckets associated with the first subset of the multiple power domains of the multiple power domains;
wherein the power domain controller is configured to:
determine a second power domain configuration based on the number of network routes being lower than the route capacity of the first power domain configuration, the second power domain configuration indicating the buckets associated with the second subset of the multiple power domains are to be enabled and buckets associated with at least a first power domain of the first subset of the multiple power domains are to be disabled; and
disable the buckets associated with the first power domain.

13. The apparatus of claim 12, wherein the power domain controller is configured to disable buckets associated with a second power domain of the first subset of the multiple power domains such that the buckets associated with the second subset of the multiple power domains remain enabled; and
wherein the power domain controller is further configured to disable the second power domain based on determining that the buckets associated with the second power domain do not store the number of network routes at the second time.

14. The apparatus of claim 12, wherein the power domain controller is further configured to:
move data representing a first set of network routes stored in a first bucket associated with the first power domain to a second bucket associated with a second power domain of the second subset of the multiple power domains; and
disable the buckets associated with the first power domain after the data representing the first set of network routes are moved from the first bucket to the second bucket.

15. The apparatus of claim 1, wherein the memory is a static random access memory (SRAM).

16. The apparatus of claim 1, wherein the apparatus is part of a switch or a router.

17. The apparatus of claim 1, wherein:
a first power supply to the first bucket and a second power supply to the second bucket of the each hash table configured to independently enable or disable, respectively, the first bucket and the second bucket.

18. The apparatus of claim 17, wherein the power domain controller is configured to:
enable the second power supply;
copy a network route from the first bucket of a first hash table of the hash tables to the second bucket of the first hash table or of a second hash table of the hash tables; and
disable the first power supply.

19. The apparatus of claim 1, wherein the buckets of each hash table of the hash tables are associated with the multiple power domains such that the first bucket of each hash table associated with the first power domain within the hash table is independently controllable to be enabled or disabled from a second bucket associated with a second power domain within the same hash table.

20. A method, comprising:
at a first time, determining a number of network routes stored in routing tables, the routing tables comprising hash tables, each hash table comprising buckets, the buckets of one of the hash tables being associated with multiple power domains such that a first bucket associated with a first power domain within the one of the hash tables is, independently controllable to be enabled or disabled from a second bucket associated with a second power domain within the same one of the hash tables, the number of network routes being stored in the buckets associated with a first subset of the multiple power domains at the first time; and
at a second time:
enabling buckets associated with a second subset of the multiple power domains based on the number of network routes; and
storing the number of network routes in the buckets associated with the second subset of the multiple power domains.

21. The method of claim 20, wherein the method further comprises, at a third time after the second time:
receiving data of a first network route to be stored in the routing tables;

determining a second power domain configuration based on whether the number of network routes is lower than a pre-determined threshold;

enabling buckets associated with the second subset of the multiple power domains based on the second power domain configuration;

selecting a first entry in a bucket associated with a power domain of the second subset of the multiple power domains; and storing data of the first network route in the first entry.

22. The method of claim 20, further comprising:

based on the number of network routes being lower than a pre-determined threshold:

moving data stored in a first bucket associated with a first power domain to a second bucket associated with a second power domain, the first power domain and the second power domain being included in, respectively, the first subset and the second subset of the multiple power domains; and disabling buckets associated with the first power domain.

23. A non-transitory computer readable medium storing instructions that, when executed by a hardware processor, causes the hardware processor to:

at a first time, determine a number of network routes stored in routing tables, the routing tables comprising hash tables, each hash table comprising buckets, the buckets of one of the hash tables being associated with multiple power domains such that a first bucket associated with a first power domain within the one of the hash tables is independently controllable to be enabled or disabled from a second bucket associated with a second power domain within the same one of the hash tables, the number of network routes being stored in the buckets associated with a first subset of the multiple power domains at the first time; and at a second time:

enable buckets associated with a second subset of the multiple power domains based on the number of network routes; and store the number of network routes in the buckets associated with the second subset of the multiple power domains.

\* \* \* \* \*